United States Patent
Alghannam et al.

(10) Patent No.: US 11,888,869 B2
(45) Date of Patent: Jan. 30, 2024

(54) SYSTEM AND METHOD FOR SECURING NETWORK USERS IN AN ENTERPRISE NETWORK THROUGH CYBERSECURITY CONTROLS

(71) Applicant: Saudi Arabian Oil Company, Dhahran (SA)

(72) Inventors: Mohammed I. Alghannam, Dhahran (SA); Ahmad A. Alharbi, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 350 days.

(21) Appl. No.: 17/465,339

(22) Filed: Sep. 2, 2021

(65) Prior Publication Data
US 2023/0065575 A1  Mar. 2, 2023

(51) Int. Cl.
*H04L 9/40* (2022.01)
*H04L 67/141* (2022.01)
*G06F 9/455* (2018.01)

(52) U.S. Cl.
CPC ...... *H04L 63/1416* (2013.01); *G06F 9/45558* (2013.01); *H04L 63/08* (2013.01); *H04L 63/164* (2013.01); *H04L 67/141* (2013.01); *G06F 2009/45587* (2013.01)

(58) Field of Classification Search
CPC ... H04L 63/1416; H04L 63/08; H04L 63/164; H04L 67/141; G06F 9/4558; G06F 2009/45587
USPC .......................................................... 726/7
See application file for complete search history.

(56) References Cited

U.S. PATENT DOCUMENTS

| 8,274,967 | B2 | 5/2012 | Xue et al. |
| 9,077,583 | B2 | 7/2015 | Ghostine |
| 9,276,877 | B1 | 3/2016 | Chua et al. |
| 9,563,480 | B2 | 2/2017 | Messerli et al. |

(Continued)

FOREIGN PATENT DOCUMENTS

| EP | 1955520 B1 | 9/2013 |
| WO | 2012075323 A1 | 6/2012 |

OTHER PUBLICATIONS

E. Rosen et al.; Network Working Group; Request For Comment 4364—BGP/MPLS IP Virtual Private Networks(VPN); Feb. 2006.

(Continued)

*Primary Examiner* — Michael S McNally
(74) *Attorney, Agent, or Firm* — Leason Ellis LLP (57) ABSTRACT

A system, a method, and a computer program are provided for securely isolating access by one or more users in a group of network users to an enterprise network implementing Multi-Protocol Label Switching (MPLS). The security system includes an MPLS Layer-3 VPN (L3VPN) instance created for a group of users to be isolated, and a remote and mobile enterprise access (RMEA) gateway with secure socket layer virtual private network (SSL-VPN) and two-factor user authentication capabilities. A de-militarized zone (DMZ) is positioned in the network to security scan data traffic between the L3VPN and RMEA gateway. The security protocol involves two-factor user authentication and establishing, on top of the L3VPN instance, an SSL-VPN session between the user and the RMEA gateway, which provides the authorized user access to the network. Additionally, data traffic to/from the user is routed through the RMEA and the DMZ.

17 Claims, 3 Drawing Sheets

(56) References Cited

U.S. PATENT DOCUMENTS

| | | |
|---|---|---|
| 9,729,514 B2 | 8/2017 | Lemaster et al. |
| 9,917,865 B2 | 3/2018 | Arora et al. |
| 10,528,433 B2 | 1/2020 | Protasov et al. |
| 10,862,868 B2 | 12/2020 | Toy |
| 2008/0112418 A1* | 5/2008 | Mehta .................... H04L 45/04 370/401 |
| 2014/0301396 A1* | 10/2014 | Hong ..................... H04L 49/25 370/392 |
| 2022/0197683 A1* | 6/2022 | Potlapally ........... G06F 13/4282 |

OTHER PUBLICATIONS

D. M'Raihi et al., Internet Engineering Task Force; Request For Comment 6238—TOTP: Time-Based One-Time Password Algorithm; May 2011.

Guide to Virtual Private Networks via the Internet between WMO Information System Centres; Dec. 31, 2016; https://library.wmo.int/doc_num.php?explnum_id=5221.

Sans Institute; Redefining your perimeter with MPLS—an integrated network solution; Dec. 31, 2007; https://www.sans.org/reading-room/whitepapers/firewalls/redefining-perimeter-mpls-integrated-network-solution-1811.

Scarfone et al.; Guide to Enterprise Telework and Remote Access Security (3A); Guide to SSL VPNs (3B—cited within 3A); Jun. 30, 2009; https://www.govinfo.gov/content/pkg/GOVPUB-C13-1bef2621487ef9cdd0627ebf671d68de/pdf/GOVPUB-C13-1bef2621487ef9cdd0627ebf671d68de.pdf; https://nvlpubs.nist.gov/nistpubs/Legacy/SP/histspecialpublication800-113.pdf.

* cited by examiner

SYSTEM AND METHOD FOR SECURING NETWORK USERS IN AN ENTERPRISE NETWORK THROUGH CYBERSECURITY CONTROLS

FIELD OF THE DISCLOSURE

The present disclosure relates to enterprise network security systems and more particularly, a system, method and computer program for securely isolating a group of users of an enterprise computer network through cybersecurity controls while still providing the secured group of users access to network and application resources.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, and optical networking technologies. The Internet carries a broad range of information resources and services, including the World Wide Web (WWW), electronic mail, telephony, and file sharing.

As the Internet evolves and network systems become increasingly under attack, technology solutions such as virtual private networks (VPNs) are taking on greater importance. A VPN can extend a private network across a public network such as the Internet and provide secure communication between communicating devices by establishing a secure point-to-point connection between the devices. VPNs typically implement tunneling and encryption technologies to prevent unauthorized access to the data carried between the communicating devices.

Early on, private network systems were built using dedicated hardware and electrical communication lines. These early network systems proved to be expensive to build and maintain. So, when less costly Frame Relay (FR) and Asynchronous Transfer Mode (ATM) technologies became available, network developers looked to these technologies to provide virtual circuits to carry data between communicating devices. Typically, these virtual circuits are provided by networks that are owned and operated by service providers such as, for example, telecommunications carriers. Due to significant limitations of FR/ATM-based network systems, however, these technologies are being replaced by IP-based VPN technology solutions such as IP tunneling and IP/Multi-Protocol Label Switching (MPLS) technologies.

MPLS technology has become the de-facto standard IP-based transport technology used by enterprises and telecommunication service providers worldwide. Telecommunication service providers rely heavily on this technology to transport data packets having different types of protocols and services for different types of end users on a single converged IP-based infrastructure. Enterprise networks also employ MPLS technology to serve enterprise users with differing requirements. One of the reasons that MPLS technology is so popular is its ability to host several VPNs on a single IP backbone while providing logical segregation between them. However, MPLS technology has some significant shortcomings that are addressed by the technology solution provided in this disclosure.

SUMMARY OF THE DISCLOSURE

The disclosure provides an IP-based technology solution, including a method, a system, and a computer program for securely isolating access by one or more users in a group of network users to an enterprise network.

According to an aspect of the disclosure, a method for securely isolating access by one or more users in a group of network users to an enterprise network implementing Multi-Protocol Label Switching (MPLS) is provided. The method comprises the step of configuring, on the network, an MPLS Layer-3 virtual private network (L3VPN) including an L3VPN instance. In particular, the L3VPN instance is configured for the group of network users and for isolating the one or more users' access to the network from other enterprise network users.

The method also comprises the step of configuring a remote and mobile enterprise access (RMEA) gateway within the network. In particular, the RMEA gateway has client-based secure socket layer virtual private network (SSL-VPN) capability and is integrated with a two-factor user authentication system.

The method also includes the step of configuring a de-militarized zone (DMZ). In particular, the DMZ is configured to implement cybersecurity checks on data traffic between the L3VPN instance and the RMEA gateway.

Additionally, the method includes the step of establishing an SSL-VPN session between a user computing device associated with a first user of the group and the RMEA gateway. In particular, the SSL-VPN session is established on top of the L3VPN instance.

The method further comprises the step of authenticating the first user using two-factor authentication and routing all data traffic between the user computing device and the enterprise network through the first L3VPN instance to the RMEA gateway and via the DMZ.

Furthermore, the method includes the step of providing, by the RMEA gateway and subject to establishing the SSL-VPN and the two-factor authentication of the first user, the user computing device access to the enterprise network.

According to a further aspect, a system for securely isolating access by one or more users in a group of network users to an enterprise network implementing Multi-Protocol Label Switching (MPLS) is provided. The system comprises an MPLS Layer-3 virtual private network (L3VPN) provided within the network, including, an L3VPN instance. In particular, the L3VPN instance is configured for the group of network users and for isolating the one or more users' access to the network from other enterprise network users.

The system also comprises a remote and mobile enterprise access (RMEA) gateway provided within the network, and the RMEA gateway having client-based secure socket layer virtual private network (SSL-VPN) capability. Furthermore, the system includes a two-factor user authentication system and a de-militarized zone (DMZ) that is configured to implement cybersecurity checks on data traffic between the L3VPN instance and the RMEA gateway.

Additionally, the RMEA gateway is configured establish, on top of the L3VPN instance, an SSL-VPN session between a user computing device associated with a first user of the group and the RMEA gateway. Furthermore, the L3VPN instance is configured to route all data traffic from the user computing device to the RMEA gateway via the DMZ. The RMEA gateway is further configured to route all data traffic to the user computing device via the DMZ. The RMEA gateway is also configured to provide the user computing device access to the enterprise network, subject to establishing the SSL-VPN session and two-factor authentication of the first user using the two-factor user authentication system.

According to a further aspect, a non-transitory computer readable storage medium storing program instructions for securely isolating access by one or more users in a group of network users to an enterprise network implementing Multi-Protocol Label Switching (MPLS) is provided. The program instructions comprise the step of configuring, on the network, an MPLS Layer-3 virtual private network (L3VPN) including an L3VPN instance. In particular, the L3VPN instance is configured for the group of network users and for isolating the one or more users' access to the network from other enterprise network users.

The program instructions also comprise the step of configuring a remote and mobile enterprise access (RMEA) gateway within the network. In particular, the RMEA gateway has client-based secure socket layer virtual private network (SSL-VPN) capability and is integrated with a two-factor user authentication system.

The program instructions also include the step of configuring a de-militarized zone (DMZ). In particular, the DMZ is configured to implement cybersecurity checks on data traffic between the L3VPN instance and the RMEA gateway.

Additionally, the program instructions include the step of establishing an SSL-VPN session between a user computing device associated with a first user of the group and the RMEA gateway. In particular, the SSL-VPN session is established on top of the L3VPN instance.

The program instructions further comprise the step of authenticating the first user using two-factor authentication and routing all data traffic between the user computing device and the enterprise network through the first L3VPN instance to the RMEA gateway and via the DMZ.

Furthermore, the program instructions include the step of providing, by the RMEA gateway and subject to establishing the SSL-VPN and the two-factor authentication of the first user, the user computing device access to the enterprise network.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview and introduction, embodiments of the disclosure provide a system and method for securing a group of network users in an enterprise IT network using cybersecurity controls. Enterprise networks are typically used by a number of different users that each require access to the resources within the enterprise network and to communicate with other users over the network. However, in practice the activities of some users present a higher security risk or threat to the network. In summary, enterprise network administrators require extra measures to secure the enterprise network and users of the enterprise network from activities of other higher-risk users, whilst providing all users including the higher-risk users with access to enterprise network resources. To address this requirement, embodiments of the disclosure provide a technical security solution implementing a number of security measures including user isolation, cybersecurity, a de-militarized zone (DMZ) and two-factor user authentication. In some embodiments, the security solution is configured to securely quarantine a group of users inside a virtual network, either to mitigate the risk of exposing those users to higher-risk users that are part of the network, or to quarantine a group of users because of the high risk associated therewith. The security solution also is configured to implement measures to securely provide the required network and application resources to any isolated group(s) of users.

Figure 1:
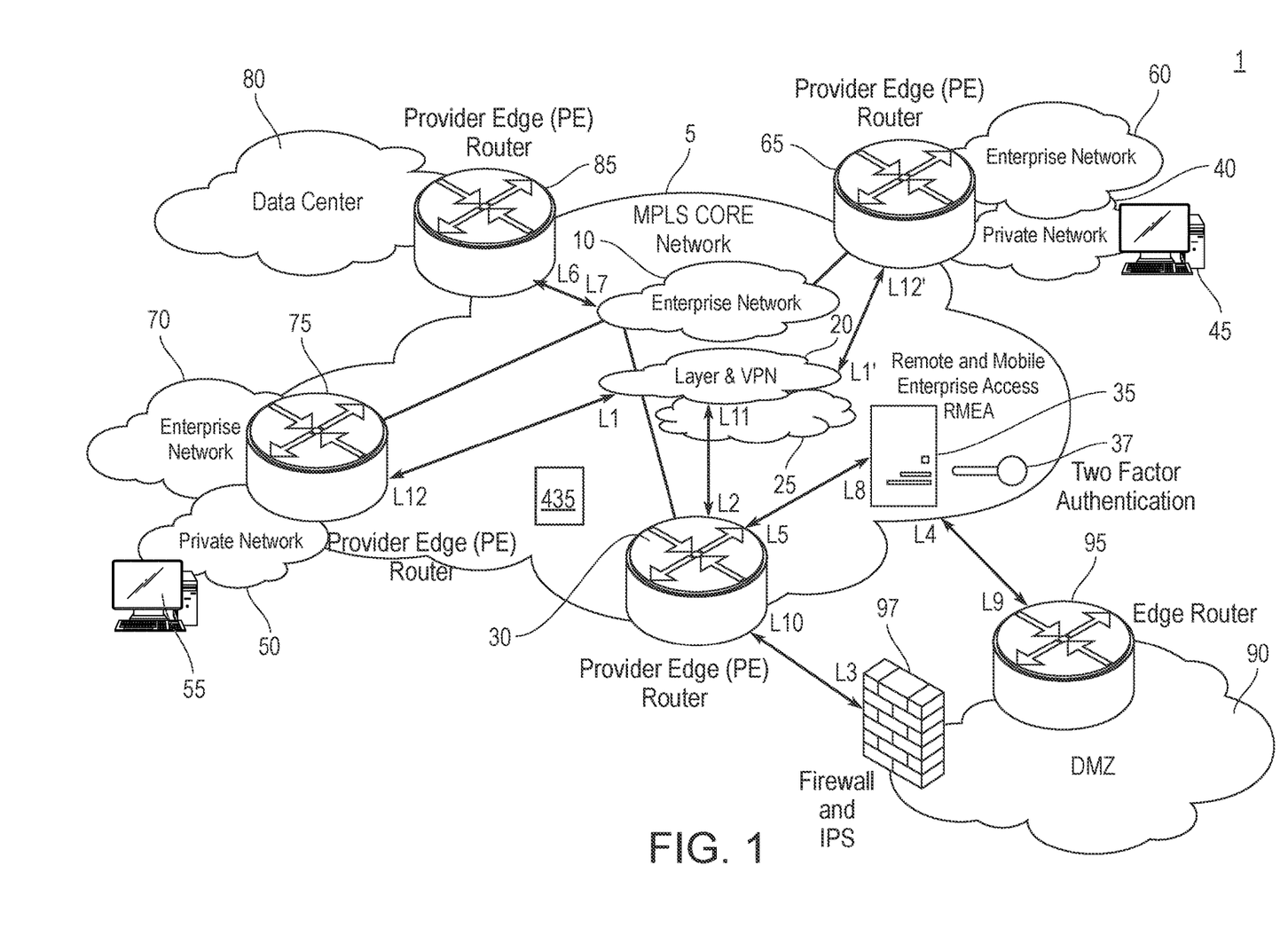
FIG. 1 shows an example of an enterprise network environment including a technological security solution according to the principles of the disclosure.

FIG. 1 shows a non-limiting example of an enterprise network environment 1 provided with a technological solution according to the principles of the disclosure. The enterprise network environment 1 can include a main enterprise network 10 and one or more subnetworks 60, 70. The main network 10 can include an enterprise main office network 10. The subnetworks 60, 70 can include, for example, enterprise branch office networks 60, 70 that connect to the main office network 10 via one or more private networks PN1 40 and PN2 50. The terms main network, main enterprise network and main office network are used interchangeably, as are the terms subnetworks and enterprise branch office networks. In this example, the enterprise environment 1 includes a pair of branch office networks 60, 70, each of which is connected to the main office network 10 via respective private networks PN1 and PN2 networks 40, 50. While only two PN networks PN1 40 and PN2 50 are shown for the sake of simplicity, the enterprise network environment 1 can include any number of PN networks.

The enterprise network environment 1 can span a wide geographic area and interconnect enterprise network users in the branch office networks 60, 70 and the main office network 10 to provide enterprise network users with access to computing resources in the main network 10 and branch office networks 60, 70. An MPLS core network 5 comprising the main office network 10 backbone can be responsible for the transmission of data across the enterprise network environment 1.

In a typical telecommunications service provider (SP) environment, a VPN instance can exist per network user in the SP's MPLS backbone and hardly require intercommunication with VPNs of other network users on the same MPLS backbone. However, in an enterprise environment, where the enterprise owns the MPLS backbone infrastructure, such total and isolated separation might not be so clear-cut or possible due to the fact that the enterprise as the core network owner is also a VPN network user, providing logical segregation to different organizations within the enterprise network backbone while at the same time hosting services and resources, some of which might be serving all the enterprise network users regardless of which VPN they belong to on an enterprise MPLS core network. In such instances, the enterprise network can use Open Systems Interconnection Model (OSI Model) Level-3 VPNs (or L3VPNs) in the enterprise MPLS core network for groups of network users to gain access to the computing resources located in, or accessible through, the enterprise main office network. Unlike Layer-2 VPNs, L3VPNs typically employ unique virtual routers for each L3VPN instance that links computing resources in the enterprise main office network to a network user in a given group.

As shown in FIG. 1, the main network 10 can include an MPLS backbone that can host a L3VPN user domain on the network's MPLS backbone, including a plurality of L3VPN instances. Only one L3VPN instance 20 is shown in this example for the sake of simplicity, but any number of L3VPN instances can be hosted by the MPLS backbone in the main office network 10. In the exemplary embodiment further described herein, the L3VPN instance 20 is configured to be used for a subset of the enterprise network users. Although not shown, the other enterprise network users can similarly be associated with one or more additional L3VPN instances.

An MPLS core network 5, which can be hosted on the backbone of the main office network 10, can include a plurality of MPLS routers, including multiple provider edge (PE) routers 30, 65 and 75, one or more provider (P) routers (not shown) and multiple customer edge (CE) routers (not shown). The provider edge routers can include a provider edge router 75 through which private network 50 is connected, and a provider edge router 65 through which private network 40 is connected. An MPLS router can encapsulate data traffic, mark the data packets to identify the L3VPN instance, and transmit the data packets across the MPLS core network to the destination.

One of the benefits to the MPLS core network 5 infrastructure is the ability to provide several segregated Virtual Private Networks as Layer-3 VPN, Layer-2 VPN, and Layer-2 tunnels on unique IP infrastructure. As noted, in a typical SP application, a VPN instance can be used per customer to isolate each user from other customers. By this the MPLS infrastructure administrator can provide logical segregation between the users. In a similar regard, in the security solution of the enterprise network environment 1, a measure used to isolate a group of users inside the enterprise network from other groups of users is to create the L3VPN instance 20 for the group being isolated. This L3VPN instance 20 will isolate the group, either to protect them from other users that are considered "high risk," or quarantine the group because of the high risk associated therewith.

The MPLS core network 5 can further be configured to provide one or more SSL-VPN (Secure Sockets Layer Virtual Private Network) instances, another form of virtual private network. As shown in FIG. 1, in an embodiment, an SSL-VPN instance 25 is established as an additional layer on top of the L3VPN instance 20. The purpose of the SSL-VPN 25 is to ensure that the users in the isolated group will communicate with the rest of the enterprise network users through a Remote and Mobile Enterprise Access (RMEA) gateway. The SSL-VPN can be initiated through client software installed on the user computers (e.g., User PC 55 and 45).

Remote and Mobile Enterprise Access is used to connect user devices to the enterprise network through the RMEA gateway 35, which is provided within the MPLS core network 5. The RMEA gateway is configured to authenticate the users before providing access to the enterprise network, and it is secured through the client-based SSL-VPN. In an embodiment, the RMEA gateway can be configured to authenticate users through a Two-Factor Authentication system 37, or other suitable user authentication system or methodology. The two-factor authentication system 37 can be a separate device or module within the MPLS core network 5, or integrated into the RMEA gateway 35. The RMEA gateway is configured to ensure that only authorized users who are part of the isolated network will have access to the enterprise network 10.

The enterprise network environment 1 can comprise additional internal or remote network resources including, for example, a data center 80. As shown in FIG. 1, a provider edge router 85 can be configured to provide a communication connection between the data center 80 and the enterprise network 10.

The security solution implemented within the enterprise network environment 1 can comprise additional cybersecurity systems including a demilitarized zone (DMZ) 90. The DMZ 90 can be a physical and/or logical component of the enterprise network environment 1 and is configured to act as a buffer zone between trusted and not trusted networks to decrease the threat factor on the enterprise network. In an embodiment, the DMZ can also host other network links from other networks to share the RMEA system.

Specifically, in the example shown in FIG. 1, an edge router 95 is provided at the edge of the DMZ 90 and configured to provide a communication connection between the DMZ and the RMEA gateway 35. The DMZ 90 can also include an Intrusion Protection System (IPS) and firewall (FW), IPS/FW 97. The firewall component of the IPS/FW 97 can be implemented, for example, using a router. The IPS measures can similarly be implemented using the same device or a separate device or module. The IPS/FW 97 is provided at the edge of the DMZ 90 and configured for controlling traffic between the PE router 30 and the DMZ 90 and implementing appropriate security measures. PE router 30 can be configured to provide a communication connection between the MPLS core network 5, including enterprise network 10 and VPNs (e.g., L3VPN 20 and SSL-VPN 25) and the IPS/FW 97 of the DMZ 90.

The enterprise network environment 1 includes an embodiment of the technological solution that can mitigate or remediate security risks or vulnerabilities associated with users of varying risk level accessing the enterprise network while still providing the users with access to resources of the enterprise network.

Figure 2:
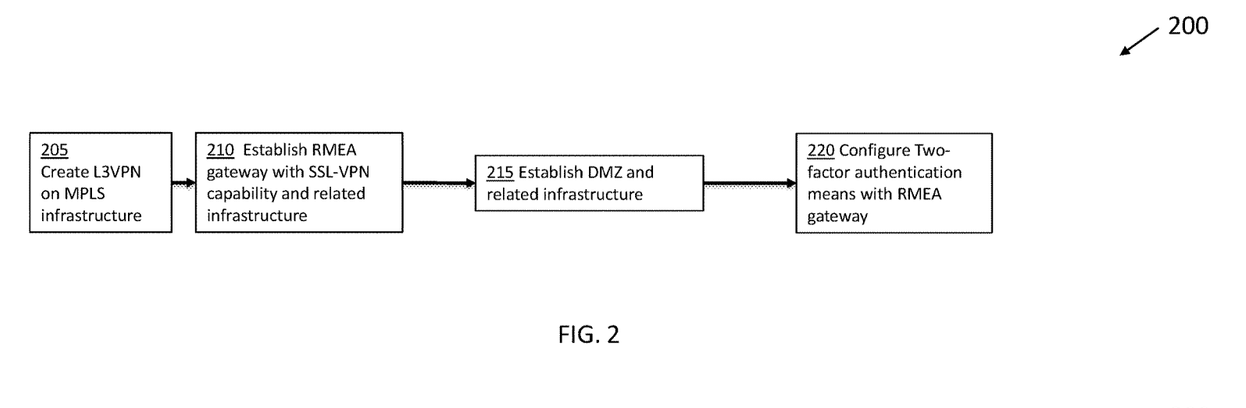
FIG. 2 shows an embodiment of a system configuration process that can be carried out by the technological security solution in FIG. 1.

The technological solution can include a process for establishing and configuring the security solution. With continued reference to FIG. 1, FIG. 2 is a process flow diagram illustrating an exemplary process 200 for configuring the security solution according to an embodiment.

At step 205, the L3VPN 20 is created on the MPLS infrastructure. In an embodiment, on top of the established MPLS, the L3VPN 20 is created on the Provider Edge routers (e.g., PE 30, 65, 75, 85 etc.). Each L3VPN will have its own VPN Routing and forwarding (VRF) policy and VRF table that is filled through filtering of the users' IP address. In an embodiment, a specific and unique L3VPN is assigned to a specific user segment/group so by default the users in the group will use the assigned L3VPN. In an embodiment, the user is isolated through different L3VPN instances, wherein every user is assigned a dedicated and unique L3VPN. Relevant to this scenario, there is no established connection between these L3VPN instances, so logically the users are isolated from each other. The foregoing steps can be configured using MPLS Routers as well as user Switches.

In an embodiment, the sub-routine for creating the L3VPN on top of the MPLS network can include, after creating the MPLS network, creating a VRF for the quarantine network. Then, a local network is added to the quarantine VRF hosted on the port connected to the local network.

At step 210, the RMEA gateway 35 and related infrastructure is established within the MPLS core network 10 and configured with the RMEA protocols. Additionally, at step 210, the RMEA gateway is configured with SSL-VPN capability. More specifically, in an embodiment, step 210 can include adding the quarantine network VRF on the MPLS router connected to RMEA and a low-risk VRF. Then, the quarantine VRF is connected to the firewall through the DMZ 90 to the RMEA 35. The REMA is also can be directly connected to the low risk group port on the MPLS router directly, or through a L2 switch. As a result, a connection between the quarantine network and the RMEA SSL-VPN gateway is provided. In an embodiment, the SSL-VPN is created through the RMEA client installed on the user's PC to establish SSL-VPN session on top of the network.

At step 215, the DMZ infrastructure 90, including the edge router 95 and the IPS/FW 97, is established. More specifically, in an embodiment, a firewall can be connected to the IPS and then to another firewall, thereby defining the DMZ infrastructure 90. This is to add a layer of protection to connect the remote leased circuit through the DMZ zone.

At step 220, the RMEA gateway is configured with a Two-Factor Authentication system 37 and methods suitable for the application requirements. In an embodiment, this can be established through RSA or SMS, for example.

Figure 3:
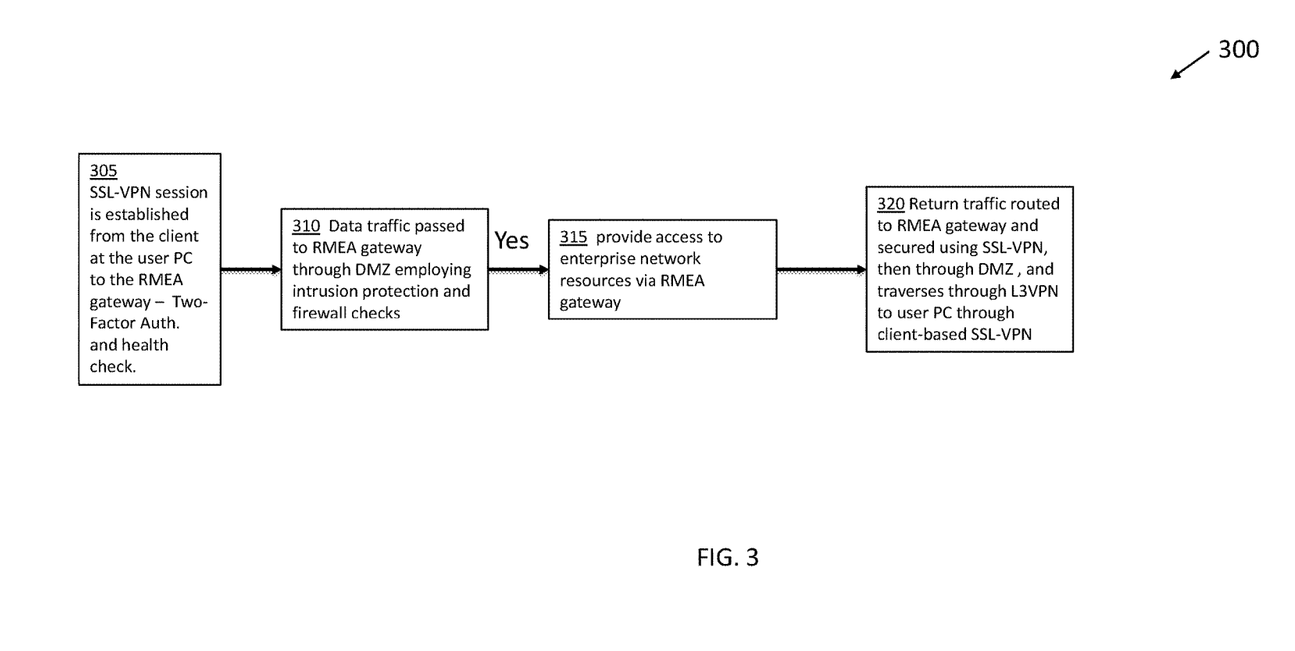
FIG. 3 shows an embodiment of a security protocol that can be carried out by the technological security solution in FIG. 1.

According to an embodiment, the technological solution can include various devices of the enterprise network environment 1 being configured to implement a security protocol for routing data traffic and enforcing various security measures according to an embodiment. FIG. 3 is a process flow diagram illustrating an exemplary security process 300 for routing traffic and implementing various security measures according to an embodiment. The process 300 is described with continued reference to FIG. 1, which includes numbered arrows L1 to L12 representing legs in the flow of user data traffic and highlighting aspects of the security protocol. As should be understood, the process 300 and user data traffic legs L1-L12 preferably occur after the steps of routine 200 are performed to configure the components of the security solution, including, creating the L3VPN 20, establishing the RMEA gateway 35, DMZ 90 infrastructure and two-factor authentication infrastructures 37. Additionally, the legs L1-L12 as further discussed herein, represent data traffic between the user PC 55 and the data center 80, wherein user PC is associated with a user in an isolated group of users.

At step 305, through client-based SSL-VPN, the SSL-VPN session 25 is established from the client at the user PC 55 to the RMEA gateway 35. The SSL-VPN session is initiated through client software installed on the user PC 55. The SSL-VPN session can be established after a security health check is implemented on the PC 55 according to the RMEA client configuration. Additionally, at step 305, a two-factor authentication request is generated to authenticate the user at PC 55 using the two-factor authentication system 37 and allow only the authorized person access. In an embodiment, the authentication is generated using two-factor authentication appliances through SMS or RSA. Accordingly, the RMEA is communicating with the two-factor authentication appliance. If authorized, the data generated from the user will go through the Layer-3 VPN reaching the RMEA gateway 35.

As shown in FIG. 1, legs L1, L2, L3 and L4 are established backbone links. User authentication can be established from the client in PC 55 and 45 to the RMEA 35. In an embodiment, the client can reach the RMEA directly, e.g., for purposes of authentication and establishing the SSL-VPN session. However, access to the enterprise network can only be provided to the client through the client SSL-VPN tunnel to the RMEA via the established backbone legs L1 (or L1'), L2, L3, and L4.

As shown by data traffic legs L3 and L4 in FIG. 1, at step 310, all data traffic on the path to the RMEA gateway 35 is routed through the infrastructure of the DMZ 90. The policy is to route all user traffic to the RMEA using the IP address assigned to RMEA. In addition, as extra security measures and control, the data traffic is preferably scanned by the IPS/FW 97, wherein the firewall is configured to allow traffic for only defined IP addresses and the intrusion prevention system scans the traffic to detect any cybersecurity threats.

At step 315, subject to the completion of step 305-310, the RMEA gateway 35 is configured to allow the user to connect to the enterprise network 10 resources. For instance, as shown in FIG. 1, the RMEA gateway can facilitate the user access to the data center 80 by routing the user data traffic to the PE router 30 (leg L5) and further onto the data center 80 via the enterprise network 10 and PE router 85 (leg L6).

As a return back from the data center 80 to the user device 55, at step 320, the data traffic will pass to the RMEA gateway 35 and back again to the user using the secured SSL-VPN 25. For instance, as shown in FIG. 1, data traffic from the PE router 85 passes to the enterprise network 10 (leg L7), then back to the RMEA gateway (leg L8) via the PE router 30. Moreover, at legs L9-L10 the data will traverse back through the DMZ 90 via the Edge Router 95 (leg L9). Within the DMZ the traffic can be scanned by the IPS/FW 97 configured to allow traffic for only defined IP addresses before being directed back to the MPLS Core network via PE router 30 (leg L10). Subsequently, at legs L11-L12, the data will traverse back through L3VPN 20 network back to the user through the client-based SSL-VPN 25.

Although the foregoing routines 200 and 300 have been described in relation to a single user at user device 55 accessing the enterprise network resources (e.g., accessing data center 80 or communication with other enterprise users via the network), the steps can similarly be implemented for any number of additional users that are a member of the isolated group assigned to the L3VPN instance 20. For instance, as shown in FIG. 1, routine 300 is similarly performed for a second user at user device 45 connected to L3VPN 20 via the private network 40 and PE router 65, wherein data traffic legs L1' and L12' between L3VPN 20 and PE router 65 represent the first and last leg of the data traffic to/from user device 45 and L2-L11 are the intervening legs. Moreover, additional L3VPN instances can be created for other user groups and the steps of routine 300 performed accordingly.

As can be appreciated from the foregoing, the systems and methods of the present disclosure securely provide an isolated group of users (e.g., high-risk users) access to the enterprise network using the enhanced security measures including the RMEA gateway 35, L3VPN instance 20, SSL-VPN 25, DMZ 90 and related protocols. By comparison, in some embodiments, users that are not within the isolated group can be provided direct access to the enterprise network via a respective layer 3 VPN instance (not shown). Moreover, in some embodiments, one or more aspects of the exemplary security solution can be modified or omitted to tailor the security solution to the application requirements. In addition or alternatively, other security measures can be implemented to tailor the security solution to the application requirements.

Figure 4:
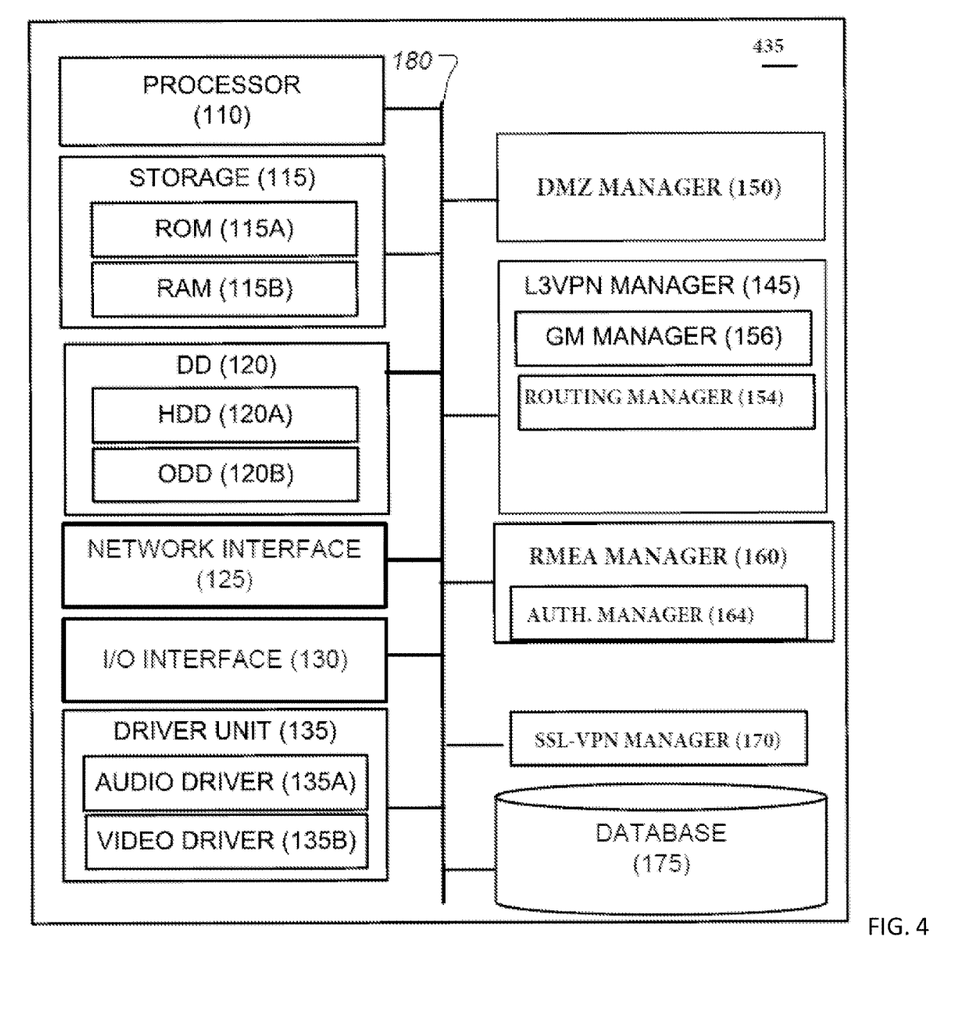
FIG. 4 shows an example of a server computing device constructed according to the principles of the disclosure.

FIG. 4 shows a non-limiting embodiment of a server computing device 435 for implementing one or more aspects of the security solution, according to the principles of the disclosure.

The Server 435 can preferably be located in the MPLS core network 5 (shown in FIG. 1), for instance as part of the main office network 10 or outside the main office network. The Server 435 can be configured to implement the various aspects of the disclosure. The Server 435 can include a processor 110, a storage 115, a disk drive (DD) 120, a network interface 125, an input/output (I/O) interface 130, and a driver unit 135. The Server 435 can include a database 175 and a system bus 180. The system bus 180 can be communicatively linked to each of the components 110 to 175 in the Server 435 by a communication link. Any one or more of the components 115 to 175 can include a device or a module that is separate from the processor 110, as seen in FIG. 2, or integrated or integratable in a device(s) such as the processor 110. The Server 435 can include a sound generation device (not shown), such as, for example, a speaker, or a display device (not shown).

The Server 435 can include a variety of devices or modules that serve to implement the various aspects of the security solution of the present disclosure including a L3VPN manager 145, a RMEA manager 160, and an SSL VPN Manager 170. The L3VPN manager 145.

As noted, in accordance with embodiments of the security solution, users are organized into user groups and each group are assigned to a respective L3VPN instance. The L3VPN manager 145 is a device or module configured to perform the operations directed to creating and managing the L3VPN instances used for respective user groups.

The L3VPN manager 145 can include a GM (group member) manager 156. The GM manager 156 can maintain a group member (GM) inventory of all groups and group members including the IP address of each GM. The GM inventory can include, in addition to the IP address for each group member, a user ID and information relating to the user's cybersecurity threat or risk level. The inventory of respective groups can be updated as new GMs are added, removed or modified. The GM manager 156 can include a device or module. The L3VPN manager 145 and GM manager 156 can be combined into a single device (not shown). Alternatively, the GM manager 156 can be provided as a separate device or module from the L3VPN manager 145.

The L3VPN manager 145 can further include a routing manager 154 configured to operate with the routers to handle routing and disseminate routing information to enterprise routers (e.g., PE routers 30, 65, 75 and 85), edge router(s) 95, IPS/FW 97, and other edge routers (not shown), as appropriate. According to a non-limiting embodiment, the L3VPN manager 145 can operate to exchange routes using MPLS MBGP protocol to exchange the routes.

The Server 435 can further include a DMZ manager (150) configured to handle operation of the DMZ 90. The DMZ manager can include a device or module and can be provided as part of the Server 435 or separately (e.g., as part of the DMZ infrastructure, say, IPS/FW 97). The DMZ manager can configure the intrusion prevention and firewall policies implemented using the IPS/FW 90. The policies can identify individual GMs (e.g., by IP address) or user groups (e.g., by an associated L3VPN instance) and specify, for respective users or groups of users, rules for allowing or blocking the exchange of data into and out of the DMZ by the firewall, as well as any intrusion prevention measures to apply. For instance, when traffic hits the IPS/FW 90, the configured policies in the firewall can determine, based on an identified GM or group associated with the traffic, whether such traffic is allowed or not. Additionally, the configured policies can determine whether any intrusion prevention measures are required to be applied to such traffic.

The Server 435 can further include an RMEA manager (160) for configuring and facilitating operation of the RMEA gateway 35 and integration of RMEA features and functionality in other elements of the system. RMEA manager 160 can further include an authentication manager (164) that configures the gateway 35 to implement user authentication, for example, through integration with the two-factor authentication system 37 and related methods. The RMEA manager can include a device or module and can be provided as part of the Server 435 or separately (e.g., as part of the gateway 35).

The Server 435 can further include an SSL VPN manager (170) for configuring the SSL-VPN instance(s) that are used as an additional layer on top of the L3VPN MPLS instance (s).

The system bus 180 can include any of several types of bus structures that can further interconnect to a memory bus (with or without a memory controller), a peripheral bus, and a local bus using any of a variety of commercially available bus architectures. The system bus 180 can include a backbone.

The processor 110 can include any of various commercially available graphic processing unit devices. Dual microprocessors and other multi-processor architectures can be included in the processor 110. The processor 110 can include a central processing unit (CPU) or a graphic processing unit (GPU). The processor 110 includes a computing device.

The Server 435 can include a computer-readable medium that can hold executable or interpretable computer code (or instructions) that, when executed by the processor 110 or one or more of the components (e.g., devices or modules) in the Server 435, causes the steps, processes and methods in this disclosure to be carried out. The computer-readable medium can be provided in the storage 115 or DD 120. The computer readable medium can include sections of computer code that, when executed cause the Server 435 to carry out a crypto process 200 (shown in FIG. 3) or crypto process 300 (shown in FIG. 5), as well as all other process steps described or contemplated in this disclosure.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the Server 435, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, a serial advanced technology attachments (SATA) drive, or the like; and, the ODD 120B can include, for example, a read/write from/to a CD-ROM disk (not shown), or can read from or write to other high capacity optical media such as a digital versatile disc (DVD). The HDD 120A can be configured for external use in a suitable chassis (not shown). The DD 120 can be connected to the system bus 180 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps that are used to execute aspects of the architecture described herein.

One or more program modules can be stored in the storage 115 or DD 120, including an operating system (not shown), one or more application programs (not shown), one or more application program interfaces (APIs), other program modules (not shown), and program data (not shown). The APIs can include, for example, web APIs, simple object access protocol (SOAP) APIs, remote procedure call (RPC) APIs, representation state transfer (REST) APIs, or other utilities and services APIs. Any (or all) of the operating system, application programs, program modules, and program data can be cached in the RAM 115B as executable sections of computer code.

The network interface 125 can be connected to a network such as the main office network 10, or the branch office networks 60 or 70 (shown in FIG. 1) among other networks and devices in the enterprise network environment 1. The network interface 125 can include a wired or a wireless communication network interface (not shown) or a modem (not shown). When used in a local area network (LAN), the Server 435 can be connected to the LAN network through the wired or wireless communication network interface; and, when used in a wide area network (WAN), the Server 435 can be connected to the WAN network through the modem. The networks 10, 40, 50, 60, or 70 (shown in FIG. 1) can include a LAN, a WAN, the Internet, or any other network. The modem (not shown) can be internal or external and wired or wireless. The modem can be connected to the system bus 180 via, for example, a serial port interface (not shown).

The network interface 125 can include a network router interface (not shown) that can communicate with the routers e.g., PE routers 30, 65, 75, 85, edge router 95 and the like. Alternatively, the network router interface can be included in the L3VPN manager 145. The network router interface can automate operations for one or more of the routers. For instance, the network router interface can configure one or more of the routers by supplying a configuration file or request information about configuration, management or operation of the router(s). In a non-limiting embodiment, one or more of the routers can communicate with, for example, an API in the Server 435. The API can include an XML API, such as, for example, an API compatible with Extensible Markup Language (XML) processing. The XML API can support available transport layers such as terminal-based protocols, including, for example, Telnet, Secure Shell (SSH), dedicated-TCP connection, or Secure Sockets Layer (SSL) dedicated TCP connection. The API can configure one or more of the routers or request information about configuration, management or operation of the router(s). The API can supply a configuration file to the routers.

The Server 435 can include a secure router (not shown). The Server 435 can encode an instruction in, for example, XML API tags, which can be received by the routers to update or change the router configuration, including terminating transmission of data packets.

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 180 to any component in the Server 435.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The database 175 can include a database management system (DBMS) (not shown), file-based storage system or any storage medium which can receive and process queries in the Server 435 to locate and retrieve data from the database 175. The database 175 can include a DBMS such as, for example, SQL, MySQL, Oracle, Access, or Unix. The database 175 can include a relational database. The database 175 can include the computing resource base and communicating device base for the entire enterprise network, including all communicating devices or computing resources in, or connected to the main office network 10. The database 175 can store user data for all users and user groups in the enterprise network, including the IP addresses of all user communicating devices and computing resources.

The terms "a," "an," and "the," as used in this disclosure, means "one or more," unless expressly specified otherwise.

The term "backbone," as used in this disclosure, means a transmission medium or infrastructure that interconnects one or more computing devices or communicating devices to provide a path that conveys data packets and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any computing device, hardware, firmware, or software that can transmit or receive data packets, instruction signals or data signals over a communication link. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for securely isolating access by one or more users in a group of network users to an enterprise network implementing Multi-Protocol Label Switching (MPLS), the method comprising:
   configuring, on the network, an MPLS Layer-3 virtual private network (L3VPN) including an L3VPN instance, wherein the L3VPN instance is configured for the group of network users and for isolating the one or more users' access to the network from other enterprise network users;
   configuring a remote and mobile enterprise access (RMEA) gateway within the network, the RMEA gateway having client-based secure socket layer virtual private network (SSL-VPN) capability and being integrated with a two-factor user authentication system;
   configuring a de-militarized zone (DMZ), wherein the DMZ is configured to implement cybersecurity checks on data traffic between the L3VPN instance and the RMEA gateway;
   establishing an SSL-VPN session between a user computing device associated with a first user of the group and the RMEA gateway, wherein the SSL-VPN session is established on top of the L3VPN instance;
   authenticating the first user using two-factor authentication;
   routing all data traffic between the user computing device and the enterprise network through the first L3VPN instance to the RMEA gateway and via the DMZ;
   providing, by the RMEA gateway and subject to establishing the SSL-VPN and the two-factor authentication of the first user, the user computing device access to the enterprise network.

2. The method in claim 1, further comprising:
   classifying the group of network users in the first L3VPN instance based on a security threat level associated with the one or more users.

3. The method in claim 1, wherein the data traffic between the user computing device and the RMEA is through the SSL-VPN session established on top of the L3VPN instance and thereby ensures that users in the isolated group communicate securely with the rest of the enterprise network through the RMEA.

4. The method in claim 1, wherein the SSL-VPN session is initiated from the user computing device, and wherein establishing the SSL-VPN session includes performing a security check on the user computing device.

5. The method in claim 1, wherein the DMZ comprises one or more of a firewall and an intrusion protection system, and wherein the DMZ is positioned in relation to the enterprise network such that all data traffic between the user group and the RMEA must pass through the DMZ.

6. The method in claim 5, wherein the firewall is configured to allow data traffic for only defined IP addresses and wherein the intrusion protection system is configured to scan the data traffic for cybersecurity threats.

7. The method in claim 1, wherein the DMZ is one or more of a physical and logical component, and wherein the DMZ is positioned outside the enterprise network.

8. The method in claim 1, further comprising:
   configuring a second L3VPN instance for another group of network users; and
   providing the another group of network users direct access to the network through the second L3VPN instance.

9. A system for securely isolating access by one or more users in a group of network users to an enterprise network implementing Multi-Protocol Label Switching (MPLS), the system comprising:
   an MPLS Layer-3 virtual private network (L3VPN) provided within the network, including, an L3VPN instance, wherein the L3VPN instance is configured for the group of network users and for isolating the one or more users' access to the network from other enterprise network users;
   a remote and mobile enterprise access (RMEA) gateway provided within the network, the RMEA gateway having client-based secure socket layer virtual private network (SSL-VPN) capability;
   a two-factor user authentication system; and
   a de-militarized zone (DMZ), wherein the DMZ is configured to implement cybersecurity checks on data traffic between the L3VPN instance and the RMEA gateway, and
   wherein the RMEA gateway is configured establish, on top of the L3VPN instance, an SSL-VPN session between a user computing device associated with a first user of the group and the RMEA gateway, wherein the L3VPN instance is configured to route all data traffic from the user computing device to the RMEA gateway via the DMZ, and the RMEA gateway is configured to route all data traffic to the user computing device via the DMZ, and wherein the RMEA gateway and is configured to provide the user computing device access to the enterprise network, subject to establishing the SSL-VPN session and two-factor authentication of the first user using the two-factor user authentication system.

10. The system in claim 9, further comprising:
wherein the group of network users are classified in the first L3VPN instance based on a security threat level associated with the one or more users of the group.

11. The system in claim 9, wherein data traffic between the user computing device and the RMEA is through the SSL-VPN session established on top of the L3VPN instance and thereby ensuring that users in the isolated group communicate securely with the rest of the enterprise network through the RMEA.

12. The system in claim 9, wherein the SSL-VPN session is initiated from the user computing device, and wherein the RMEA gateway is configured to establish the SSL-VPN session as a function of a security check performed on the user computing device.

13. The system in claim 9, wherein the DMZ comprises one or more of a firewall and an intrusion protection system, and wherein the DMZ is positioned in relation to the enterprise network such that all data traffic between the user group and the RMEA must pass through the DMZ.

14. The system in claim 13, wherein the firewall is configured to allow data traffic for only defined IP addresses and wherein the intrusion protection system is configured to scan the data traffic for cybersecurity threats.

15. The system in claim 9, wherein the DMZ is one or more of a physical and logical component, and wherein the DMZ is positioned outside the enterprise network.

16. The method in claim 1, further comprising:
a second L3VPN instance, configured for another group of network users and configured to provide the another group of network users direct access to the network.

17. A non-transitory computer readable storage medium storing program instructions for securely isolating access by one or more users in a group of network users to an enterprise network implementing Multi-Protocol Label Switching (MPLS), the program instructions comprising the steps of:
configuring, on the network, an MPLS Layer-3 virtual private network (L3VPN) including an L3VPN instance, wherein the L3VPN instance is configured for the group of network users and for isolating the one or more users' access to the network from other enterprise network users;
configuring a remote and mobile enterprise access (RMEA) gateway within the network, the RMEA gateway having client-based secure socket layer virtual private network (SSL-VPN) capability and being integrated with a two-factor user authentication system;
configuring a de-militarized zone (DMZ), wherein the DMZ is configured to implement cybersecurity checks on data traffic between the L3VPN instance and the RMEA gateway;
establishing an SSL-VPN session between a user computing device associated with a first user of the group and the RMEA gateway, wherein the SSL-VPN session is established on top of the L3VPN instance;
authenticating the first user using two-factor authentication;
routing all data traffic between the user computing device and the enterprise network through the first L3VPN instance to the RMEA gateway and via the DMZ;
providing, by the RMEA gateway and subject to establishing the SSL-VPN and the two-factor authentication of the first user, the user computing device access to the enterprise network.

* * * * *